United States Patent [19]

Friman

[11] Patent Number: 6,061,566
[45] Date of Patent: *May 9, 2000

[54] MOBILE COMMUNICATION SYSTEM AND CALL CONTROL METHOD

[75] Inventor: Leif Friman, Järvenpää, Finland

[73] Assignee: Nokia Telecommunications Oy, Espoo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/704,795

[22] PCT Filed: Mar. 3, 1995

[86] PCT No.: PCT/FI95/00122

§ 371 Date: Sep. 9, 1996

§ 102(e) Date: Sep. 9, 1996

[87] PCT Pub. No.: WO95/24789

PCT Pub. Date: Sep. 14, 1995

[30] Foreign Application Priority Data

Mar. 9, 1994 [FI] Finland .................................... 941125

[51] Int. Cl.[7] ................................................ H04Q 7/22
[52] U.S. Cl. ........................ 455/445; 455/560; 370/328
[58] Field of Search .................................. 455/435, 445, 455/560; 370/328, 337, 338

[56] References Cited

U.S. PATENT DOCUMENTS

| | | | |
|---|---|---|---|
| 5,260,987 | 11/1993 | Mauger | 455/560 |
| 5,418,838 | 5/1995 | Havermans et al. | 455/560 |
| 5,475,689 | 12/1995 | Kay et al. | 455/435 |
| 5,497,396 | 3/1996 | Delprat | 375/220 |

FOREIGN PATENT DOCUMENTS

| | | |
|---|---|---|
| 462 728 | 12/1991 | European Pat. Off. . |
| 528 639 | 2/1993 | European Pat. Off. . |
| 566 407 | 10/1993 | European Pat. Off. . |
| 467 855 | 9/1992 | Sweden . |

OTHER PUBLICATIONS

Patent Abstracts of Japan, vol. 12, No. 489, E–696, 63–204928 (Nippon Telegr, & Teleph Corp.), Aug. 24, 1988.

*Primary Examiner*—Andrew M. Dolinar
*Attorney, Agent, or Firm*—Pillsbury Madison & Sutro Intellectual Property

[57] ABSTRACT

A mobile communication system and a call control method for the mobile communication system allowing calls to be established between mobile stations located in an area of a same base station system. Uplink transmission frames are transmitted from a first base station communicating with one of a calling and a called mobile station to a second base station communicating with another of the calling and the called mobile station via the same base station system. The mobile communication system and the call control method for the mobile communication system also allow calls to be established between mobile stations in an area of two base station systems having a direct network link therebetween. The uplink transmission frames are transmitted from the first base station communicating with one of the calling and the called mobile station to the second base station communicating with another of the calling and the called mobile station via the two base station systems having the direct network link therebetween.

7 Claims, 2 Drawing Sheets

PRIOR ART

MOBILE COMMUNICATION SYSTEM AND CALL CONTROL METHOD

This application claims benefit of international application PCT/FI195/00122, filed Mar. 3, 1995.

BACKGROUND OF THE INVENTION

1. Field of the Invention

The invention relates to a mobile communication system comprising at least mobile stations; base station systems, each comprising a base station controller and several base stations; mobile services switching centers, each comprising call control means and switch means for controlling and switching calls of mobile stations; and transcoder units, each comprising encoding and decoding means for decoding an encoded speech signal received from a mobile station, and for encoding a speech signal to be transmitted to a mobile station. For switching the calls, there are network connections that are allocated call-specifically between a base station, a base station controller and a mobile services switching centre, a speech signal being transmitted in transmission frames over said network connections, the base stations and the transcoder units comprising means for building, debuilding and synchronizing the transmission frames, the uplink transmission frames transmitted by the base station to the transcoder unit containing synchronizing information on the basis of which the transcoder unit times the transmission of the downlink transmission frames to the base station.

2. Description of Related Art

In cellular or trunked radio systems, generally referred to as mobile communication systems, a mobile radio station, i.e. a mobile station communicates with a fixed network via a fixed radio station, i.e. a base station that is located in a cell. Mobile stations may freely move from one cell to another in the area of the system. A general principle of the mobile communication networks is always to direct telephone communication to the area in which a mobile station is currently located. In order to be able to route the incoming calls to the mobile station, the radio network maintains location registers, in which the location of the mobile station is known with an accuracy of one or more base stations. A mobile services switching center or a base station controller control switching of a call to the correct base station. A base station controller is used when the base stations are grouped into base station systems comprising several base stations having a common base station controller. A mobile services switching center controls telephone communication within its service area and connects the base station controllers to the outside world.

GSM (Global System for Mobile Communication) is a pan-European telecommunication system, which is becoming a world-wide standard. FIG. 1 presents, very briefly a few basic components of the GSM system. A mobile services switching center (MSC) is in charge of switching incoming and outgoing calls. It performs similar operations as in the exchange of a public switched telephone network. In addition, it also performs operations typical only of mobile telecommunication, such as subscriber location management. Mobile radio stations, i.e. mobile stations are switched to the center MSC by means of base station systems. A base station system comprises a base station controller BSC and base stations BTS. A base station controller BSC is used for controlling several base stations.

The GSM system is completely digital, and speech and data transmission also take place completely digitally, which enables a uniform high quality of speech. From the point of view of the network, the most limited resource is the radio frequency link needed on the radio path between the mobile stations and the base stations. In order to reduce the radio frequency band needed by the radio connection, speech encoding is employed in the speech transmission. The speech encoding is more efficient than the 64 bit/s transmission typically employed in telephone networks. A mobile station must naturally comprise a speech encoder and decoder for speech encoding. In the network, various speech encoding and rate adapting operations are concentrated in a transcoder unit TRCU (Transcoder/Rate Adaptor Unit). The TRCU may be located in several alternative locations within the system, according to choices made by the manufacturer. When the transcoder unit TRCU is located remote from the base station BTS, information is transmitted between the base station BTS and the transcoder unit TRCU in so called TRAU frames. Four types of frames are defined, depending on the type of information included in them. These are speech frame, operation and maintenance frame, data frame, and a so called idle- speech frame.

A transcoder unit is typically located at the mobile services switching center MSC, but it may also be a part of the base station controller BSC or the base station BTS. A transcoder unit located remote from the base station BTS must know some radio parameters for effective decoding. In addition, the timing of the transcoder unit must be adapted for the transmission of the frames over the radio path so that the frames arrive from the transcoder unit at the base station synchronized with the transmission over the radio path (this minimizes the delay owing to a remotely located transcoder unit). Specific in band-signalling is employed for this control and synchronization of the transcoder unit on a 16 bit/s channel between the base station and the transcoder unit. The channel is used for the transmission of speech or data. The remote control of the transcoder unit is defined in recommendation GSM 08.60. In order to carry out synchronization, the first two octets of each frame contain 16 synchronizing bits. In addition, the first bit of the 16-bit words the frame is composed of (2 octets) is a check bit for synchronizing. All frames contain, in addition to bits including actual speech, data or operation/maintenance information, control bits for transmitting information on the type of the frame and a varying amount of other frame-type specific information. In addition, e.g. in speech and idle frames the last four bits are allocated for the above mentioned timing adjustment.

The interfaces of a transcoder unit are a 64 kbit/s PCM (Pulse Code Modulation) interface (A Interface) towards the mobile services switching center (MSC) and a 16 kbit/s GSM interface towards the base station BTS. In the context of these interfaces, terms uplink and downlink direction are used in the GSM recommendations. The uplink direction refers to the direction from the base station BTS to the mobile services switching center MSC. The downlink direction is opposite to the uplink direction.

When a call is established from a mobile station MS to a public switched telephone network (PSTN) in a system in accordance with the recommendations, the call-related signalling is transferred from the base station BTS to the mobile services switching center MSC, which, in turn, establishes connections between the connecting line to the public switched telephone network PSTN and the channel in the above mentioned A interface. Simultaneously, the transcoder unit TRCU is allocated and switched to the channel in the A interface. The mobile services switching center MSC further gives the base station controller BSC a command to connect the base station BTS with which the calling mobile station MS has a radio connection to the above allocated channel of the A interface. The base station controller BSC establishes a connection between the above allocated A interface channel and further the base station BTS with which the calling MS is communicating. The base station BTS is independently in charge of establishing the connections over the radio path. Thus, a connection is achieved in which a mobile station MS, a base station BTS, a base station controller BSC, a transcoder unit TRCU, a mobile services switching center MSC and a public switched telephone network PSTN are connected in series. In this case, encoded speech is transmitted via this connection between MS-TRCU and TRAU frames between BTS-TRCU.

When a call is going on between two mobile stations MS located within the area of the same base station or the same base station controller, the call is switched as to the calling mobile station MS in the same way as described above, but the mobile services switching center now establishes a connection between the A interface channel allocated for the calling mobile station MS and the A interface channel of the called mobile station MS. From this second transcoder unit, in turn, a connection is established back to the same base station controller BSC, and further to the base station of the called mobile station MS. In other words, all calls between mobile stations MS subject to e.g. the same base station BTS are routed, such that the mobile services switching center, and each call is allocated two transcoder units. Long routing of this kind wastes the transmission capacity between the base station controller BSC and the mobile services switching center MSC, as well as the switching capacity of the MSC. Using or renting transmission links may have a crucial effect on the expenses of the network operator. Secondly, a solution of this kind consumes transcoder resources, since two transcoder units are switched along with each MS-MS connection. The number of the transcoder units must be planned in accordance with traffic peaks, in which case the number of the transcoder units is too high in a normal situation, both as to the costs and the number of the units. Furthermore, successive transcoding and decoding measures between the base station controller BSC and the mobile services switching center MSC impair the quality of the speech signal and cause delay of the effective signal.

The above mentioned facts have not caused too much inconvenience so far, since relatively few calls have been mobile-to-mobile calls.

In the future, however, cordless telephone exchanges, "radio PABX", will be used subject to mobile communication systems to replace internal telephone exchanges in offices. In private telephone exchanges of this kind, large numbers of calls between extensions, or so called internal calls are made, and thus a large number of calls on the level of the mobile communication system will be switched from MS to MS, as well. Thus, normal call switching of the same type as in GSM, via a mobile services switching center, will cause inconvenience, since a very large number of calls take place within the area of one single base station controller BSC, or even in the area of the same base station BTS.

SUMMARY OF THE INVENTION

The object of the present invention is to conserve transmission and transcoder resources of a mobile communication network, as well as to improve the quality of speech by avoiding the above mentioned problems.

This is achieved with a mobile communication system as set forth in the introduction, which is characterized in accordance with the invention that a base station controller BSC establishes network connections directly between the base stations located in the area of the same base station system under control of a mobile services switching center MSC so that the uplink transmission frames transmitted by a base station, and the encoded speech signal included in the uplink transmission frames are forwarded as such to another base station.

The invention further relates to a second mobile communication system of the type set forth in the introduction, characterized in accordance with the invention in that there are direct network connections between at least some of the base station controllers (BSC), and that such base station controllers (BSC) switch network connections directly between the base stations located in the area of two different base station systems under control of a mobile services switching center (MSC) so that the uplink transmission frames transmitted by a base station are forwarded as such to another base station.

The invention further relates to a call control method for a mobile communication system of the type set forth in the introduction, the method being characterized by checking, prior to allocating network connections for a call, if the calling and the called mobile station are located in the area of the same base station system, and if the mobile stations are located in the area of the same base station system A) commanding the base station controller of said base station system to switch a connection directly between the base stations of said mobile stations under control of the mobile services switching center (MSC), B) forwarding the uplink transmission frames transmitted by a base station to another base station.

C) commanding the base stations to disregard whether the transmission frame is of uplink or downlink type.

The invention further relates to a second call control method for a mobile communication system of the type set forth in the introduction, which method is characterized by checking, prior to allocating network connections for a call, if the calling and the called mobile station are located in the area of two base station systems having a direct network connection between them, if the mobile stations are located in the area of two base station systems having no direct network connection between them, switching a call via a mobile services switching center, if the mobile stations are located in the area of two base station systems having a direct network connection between them, A) commanding said base station controllers of the base station systems to switch a connection directly between each other, and further between the base stations of said mobile stations under control of the mobile services switching center (MSC), B) forwarding the uplink transmission frames transmitted by a base station as such to another base station.

C) commanding the base stations to disregard whether the transmission frame is of uplink or downlink type.

In accordance with the invention, the base station controller switches a local speech or data connection under control of the mobile services switching center without a need to establish a speech/data connection between the base station controller and the mobile services switching center. The connection is switched by means of an internal switch of the base station controller when two mobile stations are located in the area of the same base station system. In another embodiment of the invention, there is a direct transmission link between two base station controllers, and the base station controllers switch the network connections directly between the base stations located in the area of two base station systems under control of the mobile services switching center so that the uplink transmission frames transmitted by one base station are transmitted to another base station.

Since a network connection is switched directly between two base stations, the two transcoder units needed in prior art systems are also omitted from the connection. This reduces the number of the transcoder units needed in the system and, on the other hand, improves the quality of speech on the connection when unnecessary transcoding and decoding measures are omitted. The difference, owing to the omission of the transcoder units compared with the prior art, is that the uplink transmission frame of one base station is a downlink transmission frame of another base station. Therefore, in a preferred embodiment of the invention, the base station controller commands the base stations to disregard the check of the frame type.

As the transcoder units located on the transmission link between the mobile stations may be avoided with the aid of the system, the total delay of the transmission link also decreases significantly. Part of the delay is due to omitting a usual timing adjustment of the transmission frame between the base stations. Although the delay and thus the need for buffering slightly increase owing to this, the implementation of the base station is more simple than that of the prior art because the base station does not attempt to adjust the timing of the transmission frames to an optimal state.

BRIEF DESCRIPTION OF THE DRAWINGS

In the following, the invention will be explained with the aid of the preferred embodiments, with reference to the attached drawings, in which.

PREFERRED EMBODIMENTS OF THE INVENTION

The present invention may be applied in any cellular or trunked mobile communication system that utilizes digital speech transmission and speech encoding techniques lowering the transmission rate. The encoding unit is located remote from the base station, e.g. at the mobile services switching center. The encoded speech signal is transmitted in transmission frames between the transcoder and the base stations.

The first embodiment of the invention, not limited thereto, however, is the pan-European digital mobile communication system GSM (Global System for Mobile Communications) and DCS1800 (Digital Communication System). The basic components of the GSM system are described in the GSM recommendations. The GSM system is described in greater detail in these recommendations and in the book "The GSM System for Mobile Communication", M. Mouly & M. Pautet, Palaiseau, France, 1992, ISBN:2-9507190-0-7, which are incorporated herein by reference.

The GSM system is completely digital, and speech transmission is also carried out completely digitally. The speech encoding method used in speech transmission is RPE-LTP (Regular Pulse Exitation-Long Term Prediction), which utilizes both long-term and short-term prediction. The encoding results in LAR-, RPE- and LTP-parameters, which are transmitted instead of actual speech. Speech transmission is described in the GSM recommendations in chapter 06, speech encoding especially in paragraph 06.10. Since the actual invention does not relate to the speech encoding method itself and is independent of it, speech encoding will not be discussed further herein.

As mentioned above, different speech encoding and rate adapting operations are concentrated in the network in a transcoder unit TRCU (Transcoder/Rate Adaptor Unit). As also mentioned above, when the transcoder unit TRCU is located remote from the base station BTS, e.g. at the MSC, information is transmitted between the base station BTS and the transcoder unit TRCU in so called TRAU frames. The TRAU frames and their transmission procedures are described in the GSM recommendations 8.60.

Figure 1:
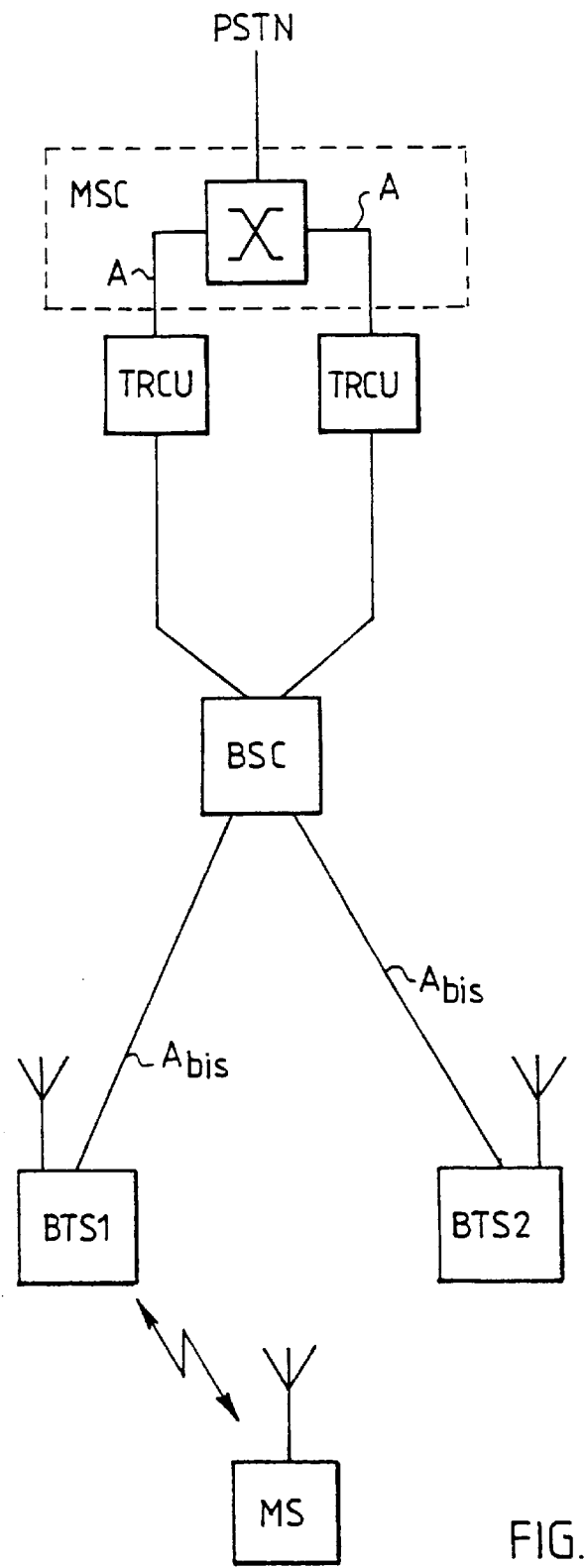
FIG. 1 shows a known mobile communication system.

As mentioned above, a call between mobile stations MS under control of the same base station BTS or the same base station controller BSC causes a situation as shown in FIG. 1, in which a call is routed from the base station system to the mobile services switching center, in which two transcoder units TRCU are allocated, subsequent to which the call is routed back the same base station system. This causes the problems described above, such as an increase in the number of transcoder units needed, impairment in the quality of speech, long transmission delays, increase in the number of the transmission channels needed, etc.

Figure 2:
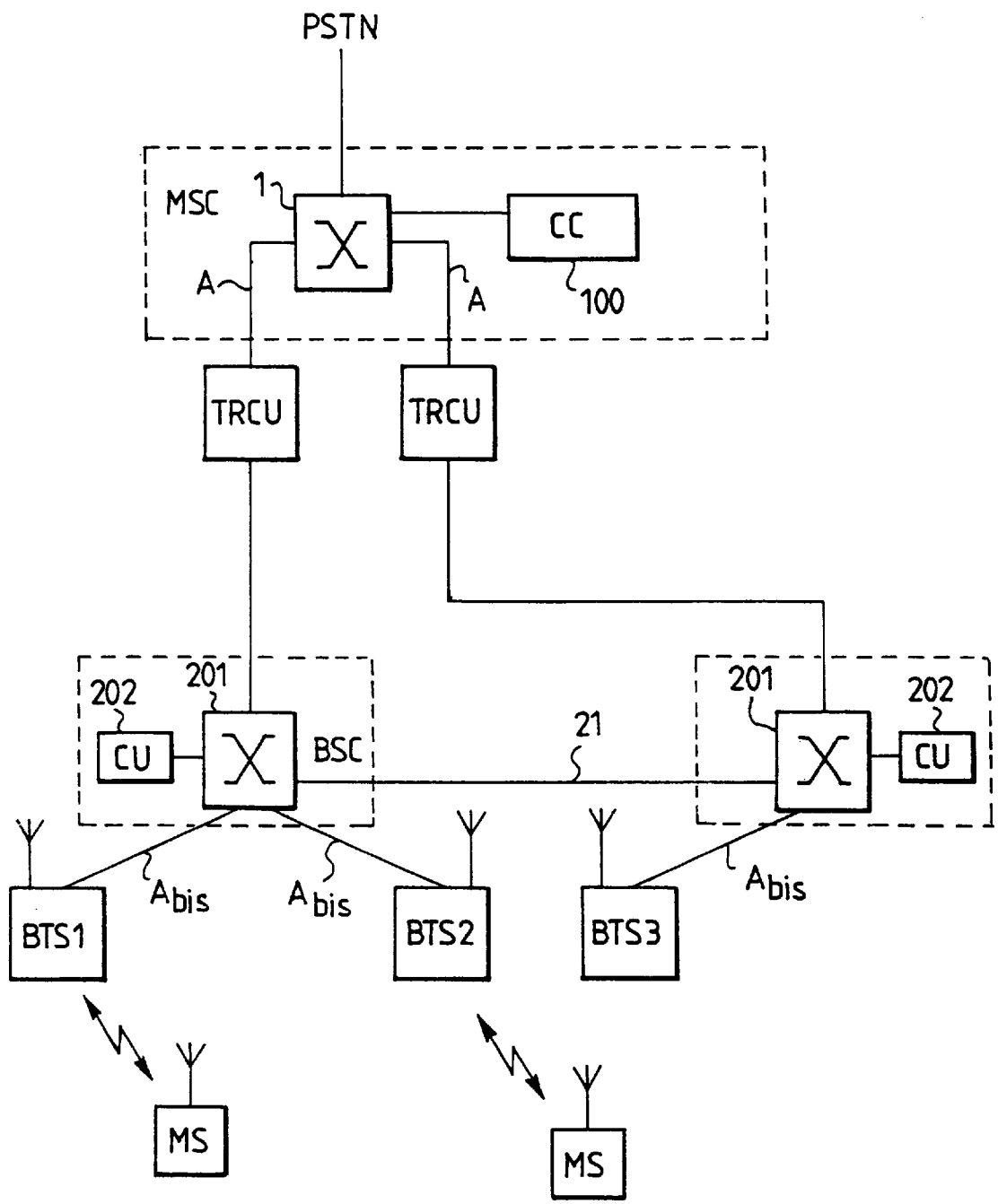
FIG. 2 shows a mobile communication system in accordance with the invention.

FIG. 2 shows a block diagram of the mobile communication system in accordance with the invention. A transcoder unit TRCU is located between a mobile services switching center MSC and a base station controller BSC. The A interface of the transcoder unit is connected by means of switch 1 either to a public services telephone network PSTN or to the A interface of another transcoder unit. Thus, switch 1 switches connections through the mobile services switching center and transmits signalling messages between a call control computer 100 and the base station systems. The operation of switch 1 is controlled by the call control computer 100.

In accordance with the invention, an internal switch of the base station controller BSC is arranged to switch the mobile stations MS located in the area of the same base station system under control of the mobile services switching center. Thus, establishing transmission connections and a transcoder unit TRCU between a base station controller and a mobile services switching center may be completely avoided. FIG. 2 only shows the functional blocks that are essential for the invention, in addition to which the base station controller may include various other operations, which do not need to be described herein, however. The operation of the base station controller is controlled by a control unit 202, which transmits and receives signalling messages. The control unit 202 controls switch 201, on the basis of the control messages received from the mobile services switching center to switch and release connections between the network links established to the base stations when both mobile stations are located in the area of the same base station system.

There may also be a direct network link between two base station controllers BSC which are under control of the same mobile services switching center MSC, as illustrated in FIG. 2 by means of a link 21. Thus, in a situation in which mobile stations MS are under control of two base station controllers BSC communicating with each other via a direct network link, the base station controllers may switch a connection between the mobile stations directly via said direct network link under control of the mobile services switching center MSC.

In the following, the operation of the mobile communication system of the invention will be described with an example in which mobile stations are located in the area of the same base station controller. A calling mobile station MS (A) initiates the call set-up to a called mobile station MS (B) located in the area of the same base station system. In that situation, a base station BTS1 starts normal signalling via the base station controller BSC to the mobile services switching center MSC. The mobile services switching center MSC finds out the location of the called mobile station MS (B) from the subscriber location register stored in the database of the network, and, subsequent to a successful search, finds that the called mobile station is located in the area of the same base station system as the calling mobile station MS (A). Subsequent to this, the mobile services switching center MSC transmits a control message to the base station controller BSC as a response to which control message the BSC establishes a network connection between the base station BTS in the area of which the called subscriber MS (B) is located and the base station controller BSC, as well as between the base station controller BSC and the base station BTS in the area of which the calling mobile station MS (A) is located. Subsequent to this, the base station controller BSC switches the so established network connections of two base stations to each other. The management of the call established between mobile stations MS (A) and MS (B) is carried out by the call control computer of the mobile services switching center MSC in the same way as in conventional radio systems. When the call needs to be released, the mobile services switching center MSC transmits a message to the base station controller BSC. On the basis of the message the traffic channels allocated from the radio path to the base stations for the connection are released, and the internal switch 201 of the BSC releases the connection.

In the system according to the invention, the TRAU frames transmitted by two base stations and the encoded speech signal included in the frames are transmitted as such from a base station to another in both directions in the internal calls of a base station controller. Thus, two transcoder units TRCU used in conventional systems are omitted from the connection. The TRCUS were used in both transmission directions for releasing the TRAU frames incoming from the base stations, decoding the encoded speech signal/ re-encoding the decoded speech signal and re-building the TRAU frames transmitted to another base station. In an internal call established in accordance with the invention, both base stations receive uplink frames transmitted by the other base station. Since a base station normally receives downlink frames, the operation of the base station is changed in the solution of the invention to accept uplink TRAU frames, as well, or alternatively, to omit the check totally in that respect. Omitting the check of the type of the uplink and downlink transmission frame is the simplest way to enable reception of TRAU frames from another base station. Furthermore, since the delay caused by the mobile services switching center and the transcoder units TRCU is omitted from the connection, a part of an error margin may be utilized by omitting a timing adjustment of the TRAU frames in accordance with the GSM recommendations from the traffic between the base stations.

The operation of the system of the invention when a call is established in accordance with the invention, between two base station controllers BSC communicating via a direct network link and being under control of the same mobile services switching center MSC is in principle similar to the above described internal call in the area of one base station controller BSC. The only difference is that the mobile services switching center MSC now controls two base station controllers BSC to establish and release the connections with the mobile stations connected with them and to switch these connections to each other via a direct network link interconnecting the base station controllers.

The figures and the description referring thereto are only intended to illustrate the present invention. The mobile communication systems and call control methods of the invention may vary in their details within the scope of the attached claims.

What is claimed is:

1. A mobile communication system comprising:

at least one mobile station;

a plurality of base station systems, each comprising a base station controller and a plurality of base stations;

at least one mobile services switching center, each of the at least one mobile services switching center comprising call control means for controlling calls of the at least one mobile station, and switch means for switching the calls of the at least one mobile station; and a plurality of transcoder units, located remotely from the base stations, each of the transcoder units comprising encoding means for encoding a speech signal to be transmitted to the at least one mobile station, and decoding means for decoding an encoded speech signal received from the at least one mobile station;

a plurality of network connections being allocated call-specifically between a base station of the plurality of base stations, a corresponding base station controller, and a mobile services switching center of the at least one mobile services switching center, wherein:

the encoded speech signal is transmitted in transmission frames over the network connections, the transmission frames include uplink transmission frames and downlink transmission frames, the base stations and the transcoder units comprise means for building, debuilding and synchronizing the transmission frames, the uplink transmission frames transmitted by the base station to a corresponding one of the transcoder units contain synchronizing information, based upon which thecorresponding one of the transcoder units times a transmission of the downlink transmission frames to the base station, a call setup signaling from a calling one of the at least one mobile station is forwarded to a serving one of the at least one mobile services switching center, the serving one of the at least one mobile services switching center checks whether the calling one of the at least one mobile station and a called one of the at least one mobile station are located within an area of a same base station controller according to subscriber data, and the serving one of the at least one mobile services switching center commands the same base station controller to establish the network connections directly between a serving one of the base stations of the called one of the at least one mobile station and the calling one of the at least one mobile stations located in the area of the same base station controller without routing a call via the transcoder units and the serving one of the at least one mobile services switching center under control of the at least one mobile services switching center so that uplink transmission frames transmitted by a first one of the serving ones of the base stations, and the encoded speech signal included in the uplink transmission frames, transmitted by the first one of the serving ones of the base stations, are forwarded to a second one of the serving ones of the base stations.

2. The mobile communication system as claimed in claim 1, wherein the call control means of the at least one mobile services switching center is arranged to check, prior to allocating the network connections for the call, whether the calling one of the at least one mobile station and the called one of the at least one mobile station are located in the area of the same base station system, and if the calling one of the at least one mobile station and the called one of the at least one mobile station are located in the area of the same base station system, the at least one mobile services switching center is arranged to transmit a message to a corresponding base station controller, an internal switch of the corresponding base station controller being responsive to the message for switching a direct connection between the calling one of the at least one mobile station and the called one of the at least one mobile station.

3. A mobile communication system comprising:

at least one mobile station;

a plurality of base station systems, each comprising a base station controller and a plurality of base stations;

at least one mobile services switching center, each of the at least one mobile services switching center comprising call control means for controlling calls of the at least one mobile station, and switch means for switching the calls of the at least one mobile station; and a plurality of transcoder units, located remotely from the base stations, each of the transcoder units comprising encoding means for encoding a speech signal to be transmitted to the at least one mobile station, and decoding means for decoding an encoded speech signal received from the at least one mobile station;

a plurality of network connections being allocated call-specifically between a base station of the plurality of base stations, a corresponding base station controller, and a mobile services switching center of the at least one mobile services switching center; and at least one direct network connection permanently provided between at least some of the base station controllers so as to allow switching of local calls directly therebetween, wherein:

the encoded speech signal is transmitted in transmission frames over the network connections, the transmission frames include uplink transmission frames and downlink transmission frames, the base stations and the transcoder units comprise means for building, debuilding and synchronizing the transmission frames, the uplink transmission frames transmitted by the base station to a corresponding one of the transcoder units contain synchronizing information, based upon which the corresponding one of the transcoder units times a transmission of the downlink transmission frames to the base station, a call setup signaling from a calling one of the at least one mobile station is forwarded to a serving one of the at least one mobile services switching center, the serving one of the at least one mobile switching center checks whether the calling one of the at least one mobile station and a called one of the at least one mobile station is located, according to subscriber data, within areas of two of the base station controllers having one of the at least one direct network connections therebetween, and the serving one of the at least one mobile services switching center commanding the two base station controllers having the one of the at least one direct network connection therebetween, to switch the one of the at least one direct network connection between serving ones of the base stations of the calling one of the at least one mobile station and the called one of the at least one mobile station located in an area of two different base station controllers so that the uplink transmission frames transmitted by a first one of the serving ones of the base stations are forwarded to a second one of the serving ones of the base stations.

4. The mobile communication system as claimed in claim 3, wherein the call control means of the at least one mobile services switching center is arranged to check, prior to allocating network connections for a call, whether a calling subscriber and a called subscriber are ones of the at least one mobile station located in the area of two different base station controllers having the at least one direct network connection therebetween, and if so, the at least one mobile services switching center is arranged to transmit messages to both corresponding ones of the base station controllers causing internal switches of the corresponding ones of the base station controllers to switch a connection between the corresponding ones of the base station controllers and further between the corresponding ones of the base stations of the at least one mobile station having the calling and the called subscribers.

5. A call control method in a mobile communication system, the mobile communication system comprising:

at least one mobile station;

a plurality of base station systems, each comprising a base station controller and a plurality of base stations;

at least one mobile services switching center, each of the at least one mobile switching center comprising call control means for controlling calls of the at least one mobile station, switch means for switching the calls of the at least one mobile station, a plurality of transcoder units, each comprising encoding means for encoding a speech signal to be transmitted to the at least one mobile station, and decoding means for decoding an encoded speech signal received from the at least one mobile station;

a plurality of network connections being allocated call-specifically between a base station of the plurality of base stations, a corresponding base station controller, and a mobile services switching center of the at least one mobile services switching center;

the base stations and the transcoder units transmitting a speech signal, included in transmission frames, over a network connection;

the base stations and the transcoder units building, debuilding and synchronizing the transmission frames;

the transcoder unit timing a transmission of downlink transmission frames to a corresponding one of the base stations according to synchronizing information received on uplink transmission frames transmitted by the corresponding one of the base stations;

the call control method comprising:
initiating a call setup to a called one of the at least one mobile station by a calling one of the at least one mobile station;
forwarding a call setup signaling from a first base station of the calling one of the at least one mobile station to a serving one of the at least one mobile services switching center;
checking by the serving one of the at least one mobile services switching center, prior to allocating the network connections for a call, if the calling one of the at least one mobile station and the called one of the at least one mobile station are located in an area of a same base station controller, and if the calling and called mobile stations are located in the same area of the same base station controller:
commanding, by the serving one of the at least one mobile switching center, the same base station controller to switch a connection directly between the first base station of the calling one of the at least one mobile station and a second base station of the called one of the at least one mobile station without routing the call via any of the transcoder units and the serving one of the at least one mobile services switching center,
forwarding the uplink transmission frames transmitted by one of the first and the second base stations to another of the first and the second base stations;
commanding the first and the second base stations to disregard whether the transmission frames are of an uplink or a downlink type.

6. The call control method in a mobile communication system as claimed in claim 5, further comprising the base stations disregarding a check of a type of the uplink or the downlink transmission frames.

7. A call control method in a mobile communication system, the mobile communication system comprising:
at least one mobile station;
a plurality of base station systems, each comprising a base station controller and a plurality of base stations;
at least one mobile services switching center, each of the at least one mobile services switching center comprising call control means for controlling calls of the at least one mobile station, and switch means for switching the calls of the at least one mobile station; and
a plurality of transcoder units, each comprising encoding means for encoding a speech signal to be transmitted to the at least one mobile station, and decoding means for decoding an encoded speech signal received from the at least one mobile station;
a plurality of network connections being allocated call-specifically between a base station of the plurality of base stations, a corresponding base station controller, and a mobile services switching center of the at least one mobile services switching center;
the base stations and the transcoder units transmitting a speech signal, included in transmission frames, over a network connection;
the base stations and the transcoder units building, debuilding and synchronizing the transmission frames;
the transcoder units timing a transmission of downlink transmission frames to a corresponding one of the base stations according to synchronizing information received on uplink transmission frames transmitted by the corresponding one of the base stations;
the call control method comprising:
initiating a call setup to a called one of the at least one mobile station by a calling one of the at least one mobile station;
forwarding a call setup signaling from a first base station of the calling one of the at least one mobile station to a serving one of the at least one mobile service switching center
checking by the serving one of the at least one mobile service switching center, prior to allocating the network connections for a call, whether a calling one of the at least one mobile station and a called one of the at least one mobile station are located in an area of two base station controllers having a direct network link permanently provided therebetween;
switching a call via the serving one of the at least one mobile switching center if the calling one of the at least one mobile station and called one of the at least one mobile station are located in an area of two base station systems having no direct network link therebetween; and
performing acts A through C if the calling one of the at least one mobile station and called one of the at least one mobile station are located in the area of the two base station controllers having the direct network link therebetween, the acts A through C comprising:
A) commanding, by the serving one of the at least one mobile service switching center, a first one and a second one of the two base station controllers to switch a connection directly therebetween, and further between the calling one of the at least one mobile station and the called one of the at least one mobile station without routing the call via any of the transcoder units and the serving one of the at least one mobile services switching center,
B) forwarding the uplink transmission frames transmitted by one of a first and a second one of the base stations to another of the first and the second one of the base stations, the first one of the base stations communicating with the calling one of the at least one mobile station and the second one of the base stations communicating with the called one of the at least one mobile station; and
C) commanding the first one of the base stations and the second one of the base stations to disregard whether the transmission frames are of an uplink or a downlink type.

* * * * *